United States Patent [19]

Chimel et al.

[11] Patent Number: 5,043,177
[45] Date of Patent: Aug. 27, 1991

[54] AROMATICS RECOVERY AND TRANSFER

[75] Inventors: Mark Chimel, Sandwich, Mass.; Yousef Ghodsizadeh, Worthington, Ohio; Don Weitzenecker, Milford Center, Ohio; Kenneth A. Yunker, Marysville, Ohio

[73] Assignee: Nestec S.A., Vevey, Switzerland

[21] Appl. No.: 652,465

[22] Filed: Feb. 7, 1991

Related U.S. Application Data

[63] Continuation of Ser. No. 119,246, Oct. 30, 1987, abandoned, which is a continuation of Ser. No. 849,487, Apr. 8, 1986, abandoned.

[51] Int. Cl.$^5$ .............................. A23L 1/221
[52] U.S. Cl. ................... 426/386; 426/387; 426/388; 426/474; 426/475; 55/84; 55/235; 55/237
[58] Field of Search ............... 426/474–475, 426/386, 387, 388; 261/78.12, 116; 55/84, 235, 237

[56] References Cited

U.S. PATENT DOCUMENTS

| | | | |
|---|---|---|---|
| 1,292,458 | 1/1919 | Hamor et al. | 426/386 |
| 2,098,961 | 11/1937 | Fronmuller | 426/386 |
| 2,513,813 | 7/1950 | Mellville | 426/387 |
| 3,704,132 | 11/1972 | Strobel | 426/387 X |
| 3,979,528 | 9/1976 | Mahlmann | 426/386 X |
| 4,072,761 | 2/1978 | Margolis et al. | 426/387 |

FOREIGN PATENT DOCUMENTS

| | | | |
|---|---|---|---|
| 289/26 | 7/1926 | Australia | 426/386 |
| 0089832 | 9/1983 | European Pat. Off. | 426/387 |
| 1062533 | 3/1967 | United Kingdom | 426/386 |

OTHER PUBLICATIONS

Perry, Chemical Engineers' Handbook, 3rd ed., 1950, McGraw-Hill Book Co., New York, pp. 699–702.

Primary Examiner—Joseph Golian
Attorney, Agent, or Firm—Vogt & O'Donnell

[57] ABSTRACT

A liquid absorbent is contacted with and atomized by an aromatics-laden gas resulting in transfer of the aromatics from the gas to the absorbent. The gas and aromatics-laden absorbent are then separated, and the aromatics-laden absorbent is collected. The aromatics may be obtained from an aromatics-bearing material, including vegatable materials such as roast and ground coffee, for example, by contacting the aromatics-bearing material with a gas.

11 Claims, 1 Drawing Sheet

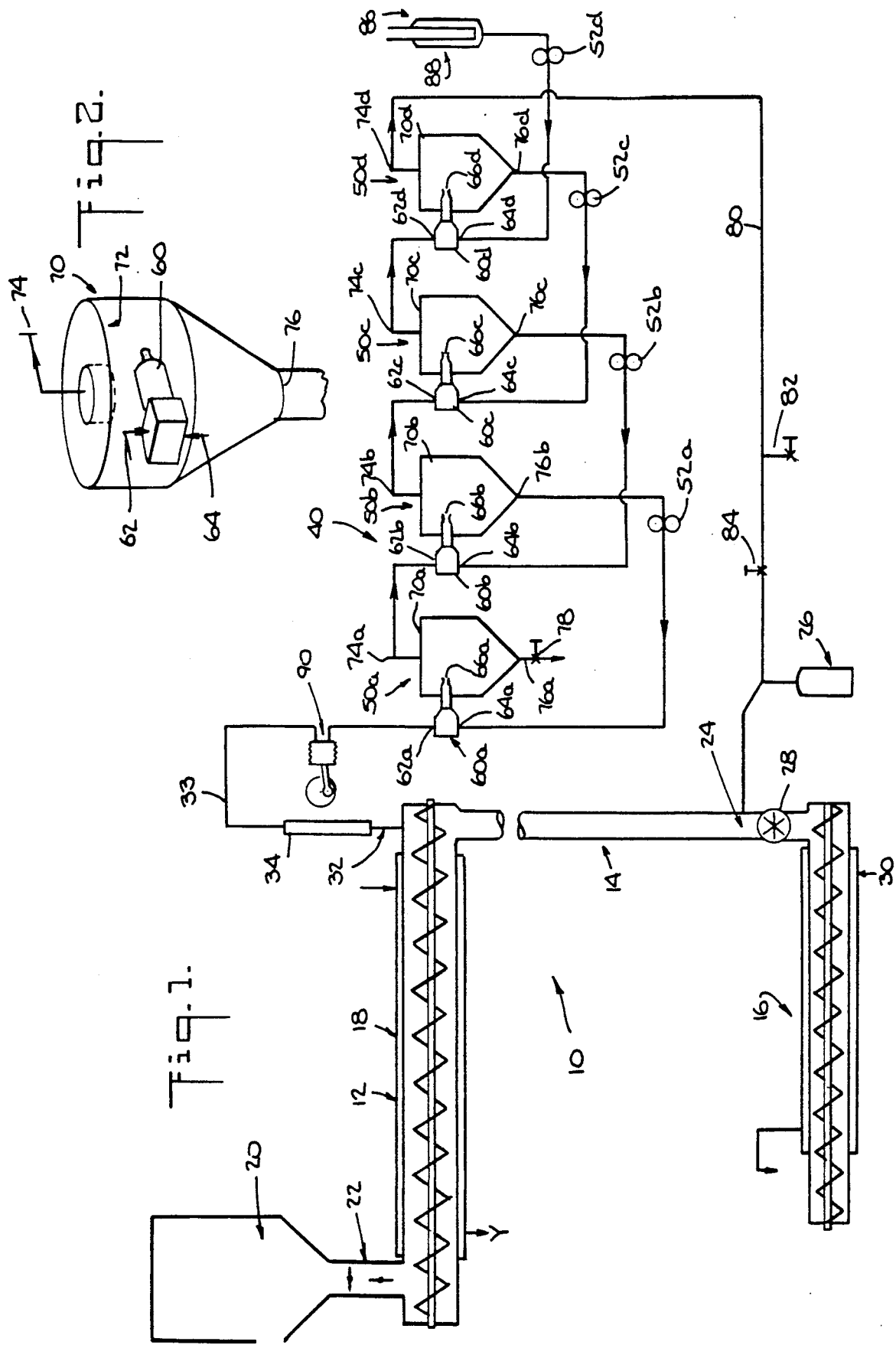

AROMATICS RECOVERY AND TRANSFER

CROSS REFERENCE TO RELATED APPLICATIONS

This is a continuation application of application Ser. No. 07/119,246 filed Oct. 30, 1987, now abandoned, which in turn is a continuation application of application Ser. No. 06/849,487, filed Apr. 8, 1986, now abandoned.

The present invention relates to transfer of aromatics from an aromatics-laden gas to a liquid absorbent. The invention also relates to obtaining aromatics from vegetable materials by means of a gas and transferring the aromatics to an absorbent which then may be incorporated with an extract or a soluble powder of the vegetable material from which the aromatics were obtained.

The composition of many vegetable materials, notably coffee, include volatile substances which contribute to the flavor and/or aroma of, for example, beverages made from the vegetable material. Such volatile substances are referred to in this disclosure as "aromatics." In the preparation of soluble or instant powders from vegetable materials, aromatics are lost and degraded during processing steps such as extraction, concentration and drying which typically are utilized to prepare the soluble or instant powder.

Various techniques have been utilized to remove and recover aromatics from the vegetable material near the beginning of the process to make a soluble powder and then return the recovered aromatics to the processed vegetable material near the end of the process. For example, cryogenic temperatures have been utilized to condense aromatics and transfer them directly to a powder material or to condense and collect the aromatics and add them to an absorbent such as a glyceride or oil, which is then added to soluble powder. Cryogenic systems, by their very nature, entail practical difficulties and expense. Other methods which do not require cryogenic conditions to obtain aromatics, such as distillation or extraction process are also known. Similarly, these methods are complex and likewise require further manipulation to incorporate the aromatics in a stable manner into an absorbent, extract, or soluble product, for example.

There remains need for improved processes and apparatus for recovering aromatics and reincorporating them with a processed vegetable material, which the present invention addresses.

SUMMARY OF THE INVENTION

In a process according to the present invention, aromatics carried by a gas are transferred to a liquid absorbent by "scrubbing" the gas with the absorbent which is atomized by the aromatics-laden gas itself. The aromatics-laden liquid absorbent is then separated from the gas. The aromatics-laden absorbent which is recovered may be directly added to an extract or to a soluble beverage powder prepared from the vegetable material from which the aromatics were derived. The aromatized absorbent also may be refrigerated and stored for subsequent use.

The present invention also provides improved compositions including the aromatized absorbent made by the process of the present invention. By providing a potent aromatized absorbent for incorporation into an extract or directly into a soluble beverage powder, only relatively small amounts of absorbent need be utilized to provide the desired concentration of aromatics in the extract or powder. The invention provides a good balance of aromatics in the absorbent and hence a desirable aroma in the final product.

Aromatics transfer between an aromatics-laden gas and a liquid absorbent is effected under turbulent conditions which are provided by contacting the aromatics-laden gas with a stream of the liquid absorbent by means such as a nozzle, whereby the liquid absorbent is sheared and atomized by the aromatics-laden gas.

The atomization of the liquid absorbent results in a significant increase in the surface area of the absorbent. The increase in surface area is influenced by the rates of flow and pressure of the gas and liquid absorbent in the system and the type of atomization device utilized. The resultant increase in surface area promotes rapid mass transfer of aromatics from the aromatics-laden gas to the liquid absorbent and also promotes equilibrium between the two phases after a relatively brief contact time, which results in a substantial fraction of the aromatics in the aromatics-bearing gas being captured by a relatively small amount of absorbent in a brief period of time.

The contacting and separating operation provides efficient transfer of aromatics to the absorbent with a low absorbent holdup; thus, low absorbent residence time can be provided along with limited absorbent throughput rates to provide a highly potent aromatized absorbent. The average residence time of the absorbent in the contacting and separating operation is directly proportional to the absorbent hold-up, or amount of absorbent present in the contacting and separating apparatus, and is inversely proportional to the absorbent throughput rate. Importantly, the relatively brief residence of the absorbent in the contacting and separating apparatus aids in preventing degradation of the aromatics.

It will be appreciated by those skilled in the art that various means may be utilized to obtain an aromatics-laden gas for use in the transfer process. However, when the preferred method of obtaining aromatics, disclosed below, is combined with the aromatics transfer process, high gas flow rates may be utilized in the step to obtain the aromatics. Thus, the entire process is amenable to, and is preferably carried out and operated continuously.

The liquid absorbent may be selected from the group consisting of aqueous extracts of vegetable material, aqueous dispersions or solutions of carbohydrates, aqueous dispersions or solutions of glycerides, edible oils, homogenized emulsions thereof and combinations thereof. The absorbent preferably includes an edible oil, as edible oils have a high affinity for aromatics. In embodiments utilizing aromatics derived from roast and ground coffee, coffee oil, aqueous extracts of coffee and homogenized emulsions thereof and combinations thereof are preferred as the absorbent.

The gas utilized should be non-reactive with the aromatics and the absorbent and should be non-toxic. Inert gases, known to those skilled in the art, are preferred.

The present invention also provides apparatus for obtaining aromatics from a vegetable material and apparatus for the transfer of the aromatics to an absorbent. The apparatus for evolving and recovering the aromatics includes means for contacting a gas with the vegetable material and for separating the aromatics-laden gas from the vegetable material. The apparatus for transferring the aromatics from the aromatics-laden gas to a liquid absorbent includes means for contacting the aromatics-laden gas with the liquid absorbent, means to atomize the absorbent and means to separate the absorbent from the gas. Means are also provided to collect the aromatics-laden absorbent.

The aromatics transfer apparatus may include one or more contacting and separating means, or stage units. Preferably, a plurality of stage units are arranged for counter-current flow of gas and absorbent. Each stage unit includes the above-noted means for contacting and shearing the absorbent with the aromatics-laden gas so that the absorbent is finely atomized by the gas. Each stage unit includes means to receive the gas/absorbent mixture and separate the same, discharge the gas for further scrubbing and/or recycle in the process and collect or deliver the aromatized absorbent to another stage or to a means for collection.

These and other objects, features and advantages of the present invention will be more readily apparent from the detailed description of certain embodiments set forth below, taken in conjunction with the accompanying drawings.

BRIEF DESCRIPTION OF THE DRAWINGS

FIG. 1 is a schematic view of apparatus according to one embodiment of the present invention.

FIG. 2 is a schematic perspective view of a portion of the apparatus illustrated in FIG. 1.

DETAILED DESCRIPTION OF THE PREFERRED EMBODIMENTS

Apparatus according to one embodiment of the present invention includes aromatics removal means 10, to obtain the aromatics evolved from a vegetable material by means of a gas, and contacting and separating means 40 to effect transfer of the aromatics from the gas to an absorbent and permit recovery of the aromatics-laden absorbent.

Although a variety of means may be utilized to obtain an aromatics-laden gas and provide it to contacting and separating means 40, and although it will be appreciated by those skilled in the art that various modifications can be made to the illustrated embodiment without departing from the spirit of the invention, it is preferred that aromatics removal means 10 comprises a screw conveyor 12, vertically extensive column 14 and discharge conveyor 16, as illustrated in FIG. 1. Intake screw conveyor 12 is provided with heating means 18, such as a steam jacket. The inlet end of the screw conveyor is connected to supply means 20 containing a vegetable material such as roast and ground coffee. Air lock 22, comprising two or more valves arranged in series, separates the source of supply of the vegetable material from the screw conveyor and thus separates the inlet of this portion of the system from the remainder of the system. In operation, this system may be purged of atmospheric conditions. Therefore, air lock 22 allows the vegetable material to be admitted to the screw conveyor at a controlled rate without exposing the interior of the conveyor to atmospheric conditions.

The outlet end of conveyor 12 communicates with and is connected to an inlet at the top end of enclosed, vertically extensive stripping column 14. Column 14 thus accepts the vegetable material from conveyor 12 via the inlet at the top of the column. A gas sparger 24 is disposed adjacent the bottom of column 14 and is connected to inert gas supply means 26. The bottom of column 14 is provided with a solids outlet which is connected via rotary vane feeder 28 to the inlet of discharge screw conveyor 16. The operation of vane feeder 28 is designed to discharge the vegetable material from the column at a controlled rate without exposing the interior of the column to the atmosphere. Discharge conveyor 16 is provided with cooling means 30, such as a water jacket.

As illustrated, aromatics-laden gas outlet line 32 is connected to the top, or solids inlet, end of column 14, adjacent the juncture of the column and the intake conveyor. Outlet line 32, however, may be positioned, if desired, at any position on conveyor 12. Gas outlet line 32 is in turn connected via condenser 34, which may be water jacketed, to scrubbing and separating means 40 which includes four stage units 50 $a$, $b$, $c$ and $d$. The stage units are preferably interconnected for counter-current flow of gas and liquid absorbent, as indicated by the arrows in FIG. 1, and each unit is enclosed and sealed from the atmosphere.

Each stage unit includes means, 60 $a$, $b$, $c$ and $d$, to contact the aromatics-laden gas and liquid absorbent whereby the absorbent is atomized by the gas. These means are illustrated in FIG. 1 as a two-fluid nozzle having separate gas inlets 62 $a$, $b$, $c$ and $d$, respectively, and liquid inlets, 64 $a$, $b$, $c$ and $d$, respectively, each communicating to nozzle outlets 66 $a$, $b$, $c$ and $d$, respectively.

Although various means to effect the atomization may be utilized, commercially available two-fluid nozzle assemblies such as those sold by the Vortec Corporation of Cincinnati, Ohio, U.S.A. under the trademark SPRAYVECTOR or those sold by the Spraying Systems Co. of Wheaton, Ill., U.S.A. under the designation "$\frac{1}{4}$ J air atomizing" are desirably employed. It will be appreciated by those skilled in the art that the gas, under pressure, and liquid absorbent are brought into contact before the outlet end of the nozzle in internal mixing nozzles, such as the Spraying Systems nozzle. In the case of external mixing nozzles, such as the Vortec nozzle, the gas and liquid absorbent are delivered out of the outlet end of the nozzle, and the gas atomizes the absorbent upon exit from the nozzle outside of the nozzle.

Desirably, the liquid absorbent is atomized to droplets having a mean volume diameter of about 40 microns or less. Desirably, at least 50% of the absorbent is in droplets smaller than 40 microns mean volume diameter. The Spraying Systems nozzle, mentioned above, provides a typical droplet size of 20 to 60 microns mean volume diameter. The vortec nozzle, mentioned above, typically provides droplets of from 1-60 microns mean volume diameter.

Each stage unit is provided with a liquid pump 52 $a$, $b$, $c$ and $d$, respectively, for feeding liquid absorbent to the liquid inlets 64 $a$, $b$, $c$ and $d$, respectively. It has been found that, as the pressurized gas tends to entrain the liquid absorbent in the system, the pumps need only provide a slight positive driving force. Each stage unit also includes a separator designated in FIG. 2 by reference numeral 70. In FIG. 1 each separator is designated by reference numerals 70 $a$, $b$, $c$ and $d$, respectively. Various gas/liquid separators known to those skilled in the art may be utilized, but it is preferred to utilize a cyclone separator as illustrated in the drawings.

As illustrated in FIG. 2, separator 70 includes chamber 72 having a nozzle 60 extending therein. It is preferred that the nozzle be directed tangentially into the interior of the separator. Alternatively, if desired, a contact chamber (not illustrated), extending from the outlet of the nozzle, may be utilized to lengthen the path of contact and the contact time between the gas and liquid absorbent upon introduction into the chamber. Each separator is provided with a gas outlet 74 at the top of and adjacent to the axis of the chamber. Each separator is provided with a liquid outlet 76 at the bottom portion of the chamber.

The terms "upstream" and "downstream" are used herein with reference to the direction of flow of gas through the stage units such that stage unit 50a is the most upstream stage unit, and stage unit 50d is the most downstream unit. Thus, the gas outlet 74 of each cyclone separator, other than that of the most downstream unit 50d, is connected to the gas nozzle inlet of the next downstream stage unit. Gas outlet 74d of the most downstream stage unit 50d is connected to gas sparger 24 of stripping means 10, via line 80 equipped with vent valve 82 and a blocking valve 84.

Compressor 90 is connected between the outlet of condenser 34 and gas inlet nozzle 62a of the nozzle of the most upstream stage 50a. Thus, aromatics-laden gas discharged from aromatics removal means 10 through the condenser is forced by compressor 90 through the stage units in succession and recycled and discharged back into aromatics removal means 10 after passage through the most downstream stage unit.

The aromatics-laden gas preferably is at super-atmospheric pressure throughout the contacting and separating, or transfer, operation, the gas pressure being highest in most upstream stage unit 50a. Although some of the pressure applied by compressor 90 is dissipated in passage of the gas through each of the stage units, typically the pressure applied by the compressor is sufficient to force the gas through all of the stage units without intermediate compression between stage units.

Each liquid outlet 76 of each separator 70 is connected, via liquid pump 52 of the next upstream stage unit, to the liquid inlet nozzle 64 of the next upstream stage unit. Liquid outlet 76a, which is incorporated in the most upstream separator 70a of stage unit 50a is connected to liquid discharge valve 78 through which the aromatics-laden absorbent is withdrawn from the system. Liquid pump 52d, connected with the liquid inlet 64d of separator 70d of the most downstream unit 50d, is connected to a reservoir 86 containing liquid absorbent. Reservoir 86 may be provided with a jacket 88, which may provide heating or cooling. The piping for handling the liquid absorbent and pumps for controlling absorbent throughput are arranged for minimum holdup of absorbent.

In a process according to the present invention, the system is purged of air by operating gas source 26 and compressor 90 with vent valve 82 open. The vent valve is then closed for the remainder of the process.

As illustrated, a vegetable material such as roast and ground coffee is supplied by supply means 20 via air lock 22 and is advanced and heated to at least 65° C. in conveyor 12. The heated coffee drops into column 14. At the beginning of the process, rotary vane feeder 28 does not operate, so that no coffee passes to discharge conveyor 16. When column 14 has been completely filled with coffee, operation of vane feeder 28 is begun at a controlled rate so that coffee is discharged from the bottom of column 14 at substantially the same rate as coffee enters the column from the intake conveyor. Thus, as the coffee advances downwardly in the column, the column remains substantially full of coffee during the process. Coffee discharged from the column, via the rotary vane feeder 28, is cooled in discharge conveyor 16 and removed from the system.

The coffee, from which the aromatics are obtained in the column, preferably has a mean particle size less than about 3 millimeters, about 1.0 to about 2.0 millimeters mean particle size being particularly preferred. The coffee desirably is maintained between about 65° C. and about 82° C. in column 14. Within this range, higher temperatures tend to promote more effective aromatics evolution. If desired, column 14 may be encased in a heating or cooling jacket to maintain the desired temperature.

A sweeping gas, such as an inert gas, is admitted into column 14 via sparger 24 and, as illustrated, passes upwardly through the column counter-current to the coffee which advances downwardly in the column. The gas contacts the warm coffee in the column and carries aromatics, water vapor and carbon dioxide evolved from the heated coffee while simultaneously obtaining additional aromatics from the coffee. The rate of gas flow through the column, expressed in standard liters per minute, preferably is at least about 3 times the coffee throughput rate expressed in kilograms per minute. Higher gas flow rates tend to be more effective in obtaining aromatics and hence are more preferred.

The aromatics-laden, moist gas is passed from the column via outlet 32 to condenser 34, where water vapor is condensed and certain of the less volatile, higher boiling aromatics are also condensed. The condensed water and high boiling aromatics are discharged from the system from the condenser such as via a receiver on the bottom of the condenser (not illustrated). The temperature of the gas exiting the condenser is a function of the temperature utilized to remove water vapor from the gas.

The aromatics-laden gas passing from the condenser to contacting and separating means 40 via line 33 is pressurized by compressor 90 and enters inlet 62a of the gas/liquid absorbent atomizing device, illustrated as nozzle 60a, of most upstream stage unit 50a. The liquid absorbent enters nozzle 60a at inlet 64a. The gas, under pressure, atomizes the stream of liquid absorbent to extremely fine droplets, thereby forming a mist of gas and liquid absorbent in chamber 72a after discharge from nozzle outlet 66a.

The mist discharged into cyclone separator 70a of stage unit 50a swirls about the axis of the separator chamber. The centrifugal effects generated by the swirling motion cause the droplets of absorbent to separate from the gas, and the liquid absorbent is passed towards the periphery of the chamber. The gas passes towards the axis of the chamber. The gas exits from the chamber gas outlet 74a at the top of the chamber. The liquid collects on the wall of the chamber and drains downwardly to liquid outlet 76a.

Substantially the same atomization, contacting and separation processes occur in each succeeding stage unit.

As is readily apparent from this description and the drawings, in the most upstream stage unit 50a, the incoming aromatics-laden gas contacts liquid absorbent which already has a substantial concentration of aromatics, whereas in the most downstream stage unit 50d, incoming aromatics-free absorbent is contacted by gas which is substantially depleted of aromatics. Thus, aromatics are progressively removed from the gas and transferred to the absorbent as the gas passes through the stage units in upstream to downstream succession, whereas the absorbent progressively becomes enriched with aromatics as it passes through the stage units in downstream to upstream succession. This counter-current arrangement not only promotes transfer of aromatics from the gas to the absorbent, but minimizes any loss of aromatics due to incomplete separation of gas and absorbent in the separators. If aromatics-laden absorbent is carried out of an upstream stage unit with the gas, it can be captured and recovered in the separator of the next downstream stage unit.

The aromatized absorbent collected at the liquid outlet 76a of most upstream stage unit 50a is discharged from the system as product. The aromatics-depleted gas, discharged from stage unit 50d, is passed through line 80 in which the blocking valve 84 is open and recycled to and through sparger 24.

During the process some gas may leak from the system, as via air lock 22 and rotary vane feeder 28. In the case of roast and ground coffee, for example, additional aromatics-laden gas (aromatics and carbon dioxide), however, is evolved from the coffee in column 14 and enters the system. The amount of aromatics-laden gas released per kilogram of roast and ground coffee is dependent on several factors, including the blend, degree of roast, particle size, coffee temperature and gas stripping rate. In general, 900 to 1800 standard cubic centimeters per hour of aromatics-laden gas (aromatics and carbon dioxide) are released per kilogram of roast and ground coffee. If the rate of leakage exceeds the rate of evolution of the aromatics-laden gas from the coffee in column 14, however, additional inert gas may be supplied by gas supply means 26. If the rate of evolution exceeds the leakage rate, gas which is substantially aromatics-free may be vented from the system downstream of stage unit 50d via vent valve 82.

The potency, or aromatics concentration, in the aromatized absorbent depends, inter alia, upon the absorbent throughput rate in the contacting and separating operation. Typically, lower absorbent throughput rates provide more potent aromatized absorbents. When an edible oil is utilized as a component of the absorbent, the desired throughput rate depends upon the oil content of the absorbent and the desired oil content of the soluble powder into which the aromatized absorbent is directly or indirectly incorporated. Thus, absorbents containing greater proportions of oil preferably are used at lower throughput rates to maintain the desired balance between potency of the aromatized absorbent and oil content.

In the practice of the process of obtaining and transfering aromatics of the present invention, the absorbent throughput rate in the transfer operation, based upon the mass of the absorbent, should be about 6% or less of the throughput rate of the vegetable material, based upon the mass of the vegetable material, in the operation to obtain the aromatics. When the absorbent includes oil, the absorbent throughput rate may be calculated on an oil basis —i.e., the absorbent throughput rate multiplied by the ratio of the mass of oil in the absorbent to the entire mass of the absorbent—and preferably is about 1.2% or less of, and most preferably, about 0.2% or less of the throughput rate of the vegetable material in the operation to obtain the aromatics, as disclosed above, particularly when the vegetable material is roast and ground coffee.

Preferably when the absorbent comprises or consists essentially of oil, the throughput rate is minimized to provide an aromatized absorbent having sufficient potency such that the desired level of aromatization can be imparted to an extract or to a soluble beverage powder with addition of only small amounts of absorbent to the extract or powder. Absorbents containing constituents other than oil can be added to an extract or to a soluble beverage product in somewhat greater absolute amounts. Accordingly, the potency required in absorbents having no or low contents of oil is less than that required with absorbents which have higher contents of oil or consist essentially of oil. It will also be appreciated by the skilled artisan that absorbent flow rates may be adjusted by the type, size and configuration of nozzle utilized to contact the gas and absorbent and atomize the absorbent.

When coffee is the vegetable material and an aqueous coffee extract is utilized in the absorbent, it is preferred that the extract be between about 15 and about 60% solids content, and preferably between 25 and 50% solids.

The temperature for contact between the liquid absorbent and the aroma-laden gas in the contacting and separating operation should be such as to permit effective atomization of the absorbent. The lower temperature limit of the absorbent will be that at which the fluid is beginning to become non-flowable such as due to formation of ice cyrstals. For aqueous dispersions of non-oil absorbents, having solids concentrations as high as 60%, the temperature of the absorbent may be as low as $-5°$ C. The optimum conditions may be determined by one skilled in the art based upon the partial pressures of the fluids, flow rates, etc. Absorbents containing more than about 50% oil by weight typically can be atomized readily at temperatures preferably above about 15° C. Temperatures between about 15° C. and about 60° C. are particularly preferred with such absorbents.

The contacting and separating apparatus may be provided with temperature control means, such as heating or cooling jackets encompassing the separators and/or the nozzle assemblies. The lines transporting the liquid absorbent and gas between the stage units may also have heating or cooling jackets.

As used in this disclosure, the term "absorbent contact time" refers to the sum of the periods between atomization and separation for a given portion of the absorbent in all of the individual stages, and hence excludes any dwell periods between stages. The absorbent contact time is preferably less than about 5 minutes, and more preferably less than about 2 minutes. The "absorbent contact time" may also be considered as a measure of the exposure of the absorbent to degradation. The total residence time of the absorbent in the contacting and separating operation, as referred to herein, is the average time from the moment a particular portion of the absorbent first contacts the aromatics-laden gas to the moment such portion of absorbent is last separated from the gas. The residence time of the absorbent is typically less than about 60 minutes and preferably less than about 30 minutes. In a multistage contacting and separating operation, the absorbent residence time includes dwell periods between stages. As the aromatics-laden absorbent may be subject to degradation of the aromatics, it may be protected from such degradation between stages, as by cooling the absorbent during dwell periods between stages and reheating prior to further atomization.

The process of the present invention typically is operated in conjunction with conventional extraction and drying processes used to prepare dry soluble beverages. Thus, the vegetable material discharged from the aromatics obtaining step of the present process may be employed in a conventional extraction process and the resulting aqueous extract dried to form a powder. The aromatized absorbent obtained from the aromatics transfer step of the process may be combined with an extract and thereafter the resulting mixture is dried, or the aromatized absorbent may be sprayed on dry soluble powder, or it may be encapsulated in soluble solids and then mixed with dry soluble powder. The aromatized powder resulting from the present invention may be characterized by conventional methods, such as by gas chromotography, and differentiated from aromatized powders which have been made by other aromatics recovery and incorporation methods known in the art.

The level of aromatics addition in a soluble product may be expressed as "percent of stoichiometry." In the case of coffee, at 100% stoichiometry, the aromatics recovered from 100 parts by weight roast and ground coffee are incorporated in the soluble coffee powder obtained from 100 parts by weight roast and ground coffee, whereas at 50% stoichiometry the aromatics recovered from 50 parts by weight roast and ground coffee are incorporated in soluble coffee powder obtained from 100 parts by weight roast and ground coffee, and so on. Because the present aroma recovery process effectively incorporates aromatics from substantial quantities of roast and ground coffee in a small amount of absorbent, substantial quantities of aromatics may be incorporated in the soluble coffee powder without introducing excessive amounts of absorbent into the powder. Thus, aromatization levels of 50% to 100% stoichiometry may be achieved, aromatization levels of 100% stoichiometry being particularly preferred.

Numerous variations and combinations of the features described above may be employed according to the present invention. Although multistage, countercurrent contacting and separating of the aromatics-laden gas and the absorbent is preferred, single stage scrubbing or multistage co-current contacting and separating may be employed. The gas and absorbent may be separated by directing the mist into a packed column at each stage, so that the absorbent droplets coalesce on the packing and drain from the column. Also, aromatics-depleted gas can be vented from the system and replaced by fresh gas.

Also any residual aromatics remaining in the aromatics-depleted gas discharged from the system may be recovered by further processing of the gas, as by cryogenic condensation or by contacting the aromatics-depleted gas directly with a soluble powder. Aromatics-laden gases from other sources may be combined with the aromatics-laden gases evolved in the aromatics obtaining step. For example, it is known that appreciable quantities of aromatics are evolved from roast coffee during the grinding operation. These aromatics, for example, may be obtained by directing the gas through the grinding operation before introduction into column 14.

Features of the present invention are exemplified by the following illustrative examples:

EXAMPLE 1

Roast and ground coffee is fed at 2.2 kg/min into the inlet air lock of an apparatus as illustrated in FIG. 1 and is transferred to the inlet conveyor. The roast and ground coffee is heated to about 80° C. as it passes through the inlet conveyor. An inert gas initially consisting of nitrogen is introduced at the rate of 6.6 l/min (standard temperature and pressure) through the sparger at the bottom of the columnn and passes upwardly through the coffee descending in the column. The gas discharged at the top of the column is dried and cooled to about 20° C. in the water-jacketed condenser. The dried gas is compressed to about 140 kPa (gauge pressure) before entry to the most upstream stage unit. Each contacting and separating stage of the apparatus is equipped with a Spraying Systems model 2850/70 two-fluid nozzle discharging into a cyclone separator about 10 cm in diameter at its large end. An absorbent consisting of coffee oil at a temperature of about 18° C. is advanced through the stages countercurrent to the gas flow at a rate of about 0.005 kg/min.

The gas exiting from the most downstream aromatics transfer stage, at a pressure of about 7 kPa, is returned to the sparger, so that the gas continually recirculates through the system. As the process continues, nitrogen is lost from the system through leakage and replaced by aromatics-laden gas evolved from the roast and ground coffee.

The aromatics depleted roast and ground coffee discharged from the aromatics obtaining operation is converted to a dry soluble coffee powder by conventional extraction and drying procedures. All of the aromatized oil obtained from the contacting and separating operation is added back to the dry powder to aromatize the powder at 100% stoichiometry. The resulting composition contains about 0.5% aromatized oil by weight based on the weight of coffee solids in the composition. The aromatized powder has a pleasing, well-balanced coffee aroma and on reconstitution provides a coffee beverage of pleasing, well-balanced flavor.

EXAMPLE 2

The procedure of Example 1 is performed with the exception that the aromatized oil that is obtained from the aromatics transfer operation is homogenized in concentrated coffee extract prior to the drying operation. The quantity of the homogenized extract and oil that is utilized is such that in the dried powder, the composition contains about 0.5% aromatized oil by weight. The resulting composition has a well-balanced coffee-like in-cup aroma upon reconstitution by the addition of hot water. The volatile aromatics recovered in the absorbent and retained through the drying stage contribute to a pleasing aroma that is reminiscent of roast and ground coffee notes.

EXAMPLE 3

The procedure of Example 1 is performed with the exception that the roast and ground coffee is heated to about 65° C. The aromatized powder has a pleasing, well-balanced coffee aroma which has a relative aroma strength of about 40% of the relative aroma strength of the aroma of the powder of Example 1, when tested by gas chromatographic means.

EXAMPLE 4

The procedure of Example 1 is repeated with the exception that the inert gas consisting of nitrogen is introduced at the rate of 13.2 l/min through the sparger at the bottom of the column. The resultant aromatized coffee powder also has a pleasing well-balanced aroma which has an relative aroma strength of at least 50% greater than the relative aroma strength of the powder of Example 1, when tested by gas chromatographic means.

What is claimed is:

1. A process for transferring aromatics from aromatics-laden gas to a liquid absorbent comprising pressurizing the aromatics-laden gas and bringing the pressurized gas into contact with a liquid absorbent in a spray nozzle and shearing and atomizing the liquid absorbent at the spray nozzle, by means of the gas, for transferring the aromatics from the gas to the liquid absorbent, and then separating aromatics-depleted gas from aromatics-laden liquid absorbent.

2. A process according to claim 1 wherein the absorbent is selected from the group consisting of aqueous extracts of vegetable material, aqueous dispersions or solutions of carbohydrates, aqueous dispersions or solutions of glycerides, edible oils and homogenized emulsions thereof and combinations thereof.

3. A process for transferring aromatics from a vegetable material to a liquid absorbent comprising:
   (a) obtaining aromatics from a vegetable material by contacting the vegetable material with a gas for obtaining an aromatics-laden gas and separating the aromatics-laden gas from the vegetable material; and
   (b) pressurizing the aromatics-laden gas and bringing the pressurized gas into contact with a liquid absorbent at a spray nozzle and shearing and atomizing the liquid absorbent at the spray nozzle, by means of the gas, for transferring the aromatics from the gas to the liquid absorbent, and then separating aromatics-depleted gas from aromatics-laden liquid absorbent.

4. A process according to claim 3 wherein the vegetable material is roast and ground coffee and the absorbent comprises coffee oil.

5. A process according to claim 4 further comprising adding the aromatics-laden absorbent to coffee extract or to soluble coffee powder.

6. A process according to claim 3 wherein the vegetable material is heated and conveyed to a column at a controlled rate, contacted by the gas utilized to obtain the aromatics in the column and then discharged from the column at a controlled rate.

7. A process according to claim 3 wherein the vegetable material is roast and ground coffee and is continuously advanced to, contacted by and discharged from the gas utilized to obtain the aromatics and the rate of gas flow in standard liters per minute contacting the roast and ground coffee is at least about 3 times the coffee throughput rate in kg of coffee per minute.

8. A process according to claim 3 wherein the aromatics obtaining step further comprises continuously:
   (a) heating and conveying the vegetable material to a vertical column at a controlled rate;
   (b) introducing the gas into the bottom of the column;
   (c) advancing the vegetable material downwards in the column and discharging it from the column at a controlled rate and then conveying the vegetable material away from the column; and
   (d) discharging aromatics-laden gas from the column.

9. A process according to claim 6 or 8 wherein the vegetable material is roast and ground coffee which is maintained at a temperature between about 65° C. and 82° C. in the column and the rate of gas flow in standard liters per minute contacting the roast and ground coffee through the column is at least 3 times the coffee throughput rate in kg of coffee per minute.

10. A process according to claim 1 or 3 wherein aromatics are transferred from the aromatics-laden gas to the liquid absorbent in a multiple stage system by contacting, entraining, atomizing and separating eh aromatics-laden gas and liquid absorbent at least twice by passing the aromatics-laden gas and the liquid absorbent in a counter-current fashion through the system whereupon, via each atomization and separation, the liquid absorbent is enriched with aromatics and the aromatics-laden gas is depleted of aromatics.

11. A process according to claim 1 or 3 wherein the liquid absorbent is entrained by the pressurized aromatics-laden gas.

* * * * *

UNITED STATES PATENT AND TRADEMARK OFFICE
CERTIFICATE OF CORRECTION

PATENT NO. : 5,043,177
DATED : August 27, 1991
INVENTOR(S) : Mark CHIMEL, et al.

It is certified that error appears in the above-identified patent and that said Letters Patent is hereby corrected as shown below:

Column 12, line 36, (line 3 of claim 10) "eh" should be --the--.

Signed and Sealed this

Sixth Day of October, 1992

*Attest:*

DOUGLAS B. COMER

*Attesting Officer*      *Acting Commissioner of Patents and Trademarks*